(12) United States Patent
Watanabe et al.

(10) Patent No.: US 6,243,546 B1
(45) Date of Patent: Jun. 5, 2001

(54) IMAGE FORMING APPARATUS

(75) Inventors: Yukio Watanabe, Machida; Shigemichi Hamano, Shizuoka-ken, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/361,178

(22) Filed: Jul. 27, 1999

(30) Foreign Application Priority Data

Jul. 30, 1998 (JP) .................................................. 10-215691

(51) Int. Cl.[7] ............................ G03G 15/20; G03B 27/00
(52) U.S. Cl. ........................... 399/69; 399/67; 399/70; 399/337; 355/405
(58) Field of Search .............................. 355/405; 399/33, 399/37, 67, 69, 70, 88, 122, 320, 328, 330, 335, 337

(56) References Cited

U.S. PATENT DOCUMENTS

| | | | |
|---|---|---|---|
| 5,467,177 | * 11/1995 | Iwama et al. | 355/282 |
| 5,651,540 | 7/1997 | Watanabe et al. | 271/10.12 |
| 5,742,870 | * 4/1998 | Hwang | 399/69 |
| 5,819,134 | * 10/1998 | Sato et al. | 399/69 |
| 5,819,149 | 10/1998 | Watanabe et al. | 399/330 |
| 5,903,799 | * 5/1999 | Saito et al. | 399/69 |
| 6,008,829 | * 12/1999 | Wakamiya et al. | 347/156 |
| 6,011,938 | * 1/2000 | Toizumi | 399/69 |
| 6,032,017 | * 2/2000 | Jewell et al. | 399/336 |

* cited by examiner

Primary Examiner—Russell Adams
Assistant Examiner—Rodney Fuller
(74) Attorney, Agent, or Firm—Fitzpatrick, Cella, Harper & Scinto

(57) ABSTRACT

An image forming apparatus has a document scanning unit which can be shifted while illuminating an original and which is shifted backwardly at a speed faster than a speed when said document scanning unit is shifted forwardly to scan the original, and a control unit which lowers the electric power supplied to an image fixing means when the document scanning unit is shifted backwardly.

5 Claims, 4 Drawing Sheets

FIG. 7

| | CONSUMPTION OF ELECTRICITY IN FORWARD SCANNING | CONSUMPTION OF ELECTRICITY IN BACK SCANNING | PEAK OF CONSUMPTION OF ELECTRICITY |
|---|---|---|---|
| CONVENTIONAL ART 1 (WITHOUT ORIGINAL EXCHANGING APPARATUS) | 1300W | 1365W | 1365W |
| FIRST EMBODIMENT | 1300W | 815W | 1300W |
| SECOND EMBODIMENT | 1300W | 815W | 1300W |
| CONVENTIONAL ART 2 (WITH ORIGINAL EXCHANGING APPARATUS) | 1300W | 1495W | 1495W |
| THIRD EMBODIMENT | 1300W | 945W | 1300W |
| FOURTH EMBODIMENT | 1300W | 945W | 1300W |

IMAGE FORMING APPARATUS

BACKGROUND OF THE INVENTION

1. Field of the Invention

The present invention relates to an image forming apparatus such as a copying machine and the like.

2. Related Background Art

Conventionally, in image forming apparatuses such as copying machines, a fixing device including a heat pressing roller has been used as a fixing means for fixing an image to a transfer sheet. Since the fixing device including such a heat pressing roller utilizes a heat source having great consumption of electricity such as a halogen heater, it is very difficult to reduce consumption of electricity of the entire image forming apparatus.

Particularly, continuous copying operations are effected by using a copying machine having a fluorescent lamp as an illumination light source of an original scanning portion, since consumption of electricity becomes great during back scanning for returning an original scanning body from a scan finishing position to a home position, maximum consumption of electricity of the machine may not be suppressed within a desired range. The reason is that it takes a long time for the fluorescent lamp to stabilize a light amount after the lamp is turned ON so that the fluorescent lamp cannot be turned OFF during the back scanning, and a shifting speed of the original scanning body in the back scanning is faster than in forward scanning, with the result that consumption of electricity of a drive motor during the back scanning becomes great.

Due to such great consumption of electricity in the back scanning of the original scanning body, the consumption of electricity of the entire machine may not be suppressed within the desired range.

SUMMARY OF THE INVENTION

The present invention aims to eliminate the above-mentioned conventional drawback, and an object of the present invention is to provide an image forming apparatus which can suppress consumption of electricity of the apparatus when a document scanning unit is shifted backwardly.

Another object of the present invention is to provide an image forming apparatus comprising a document scanning unit which can be shifted while illuminating an original and which is shifted backwardly at a speed faster than a speed when the document scanning unit is shifted forwardly to scan the original, an image fixing means for fixing an image on a recording material, and a control means for controlling an electric power supplied to the image fixing means, and the control means lowers the electric power supplied to the image fixing means when the document scanning unit is shifted backwardly.

The other objects and features of the present invention will be apparent from the following detailed explanation referring to the accompanying drawings.

BRIEF DESCRIPTION OF THE DRAWINGS

FIG. 7 is a view showing consumption of electric powers in the first to fourth embodiments of the present invention and in conventional cases.

DESCRIPTION OF THE PREFERRED EMBODIMENTS

The present invention will now be fully explained with reference to accompanying drawings.

First Embodiment

Figure 1:
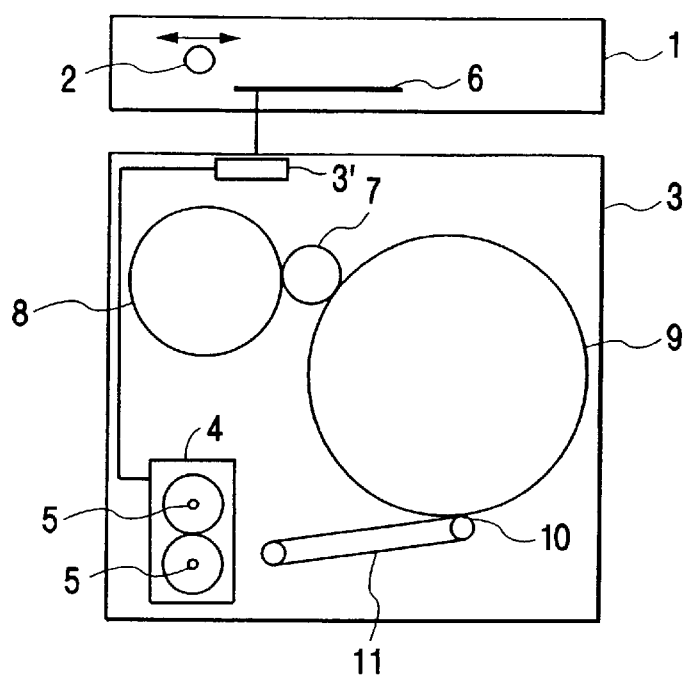
FIG. 1 is a schematic view showing an entire construction of an image forming apparatus according to first and second embodiments of the present invention.

FIG. 1 shows an example of an image forming apparatus according to the present invention.

An original is illuminated by a light source 2 (fluorescent lamp in this example), and light reflected from the original is converted into an image signal by a photo-electrical converting element such as CCD. The image signal is appropriately altered by a reader controller 6 and then is sent to a printer portion 3.

In the printer portion 3, on the basis of the image signal sent from the reader controller 6, a photosensitive drum 7 is subjected to image exposure to form an electrostatic latent image.

The electrostatic latent image is visualized with toner by a developing unit 8, and, thereafter, the visualized toner image is primarily transferred onto an intermediate transfer drum 9.

Then, the toner image is transferred onto a recording material at a secondary transferring station 10, and the recording material on which the toner image was born is brought, by a transfer belt 11, to a fixing device 4, where the toner image is fixed to the recording material by heat and pressure.

In this case, the reader controller 6 sends an interruption signal to a controller 31 the printer portion 3 in synchronous with a back scanning operation for returning the light source 2 to an initial position for the original scanning.

In controller 31 of the printer portion 3, on the interruption signal sent, a way for controlling a temperature of the fixing device 4 is altered.

The fixing device 4 comprises a fixing roller (upper roller having an outer diameter of 46 mm, a rubber thickness of 2.1 mm and a PFA tube having surface layer thickness of 50 $\mu$m) and a pressure roller (lower roller having an outer diameter of 46 mm, a rubber thickness of 2.3 mm and a PFA tube having surface layer thickness of 50 $\mu$m), and halogen heaters 5 (both 550 W) as heating sources are incorporated within the rollers.

In the illustrated embodiment, as the way for controlling the temperature of the fixing device, a method in which only the heater of the upper roller among the heaters of the fixing device 4 is turned ON/OFF is used.

Figure 3:
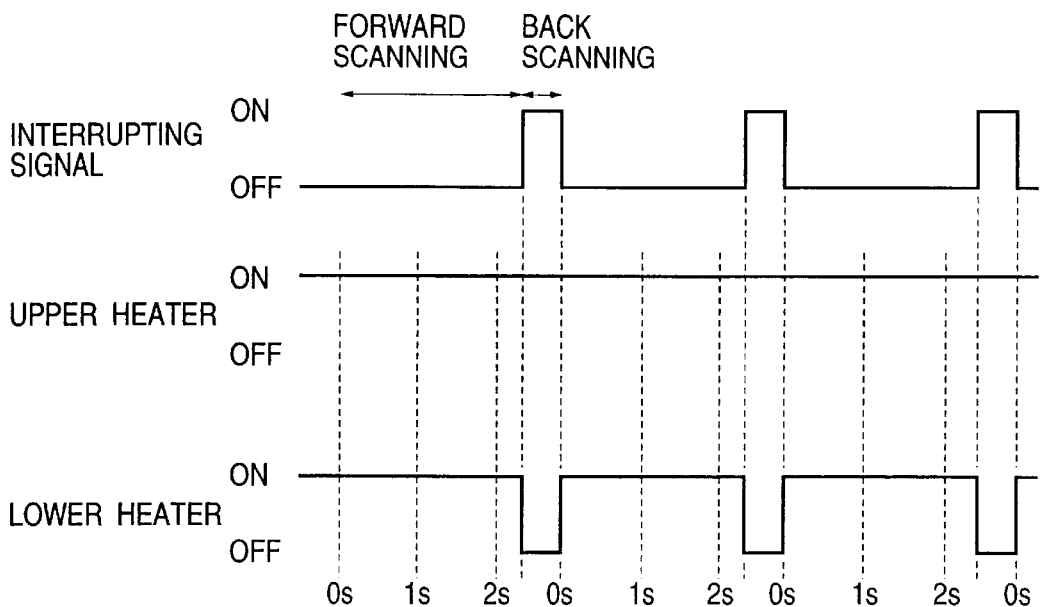
FIG. 3 is a time chart showing an ON timing of a heater in the first embodiment.

This is shown in FIG. 3.

After original scanning (forward scanning) for about two seconds, the light source is returned to the home position (back scanning) for about 0.5 second.

Since the speed of the back scanning is faster than the speed of the forward scanning by about four times, consumption of electricity of the original reading apparatus becomes maximum during the back scanning (since the fluorescent lamp cannot be turned OFF during the series of image forming operations, as mentioned above).

More specifically, the consumption of electricity becomes greater in the back scanning than in the forward scanning by about 65 W.

In this case, as shown in FIG. 3, by turning OFF only the upper heater, peak of consumption of electricity can be reduced.

More specifically, in the back scanning, the consumption of electricity of 550 W corresponding to one of heaters in the illustrated embodiment can be reduced.

Further, in comparison with the case where the lower heater is not turned OFF in the back scanning, since the peak of consumption of electricity becomes that in the scanning, maximum consumption of electricity can be reduced by 65 W.

When such fixing temperature control is effected, in the back scanning, heat amount applied to the fixing device is reduced to half.

However, in effect, since the time of back scanning is shorter than the time of forward scanning by about ¼ and the heat amounts of the fixing roller and the pressure roller, even if the heaters are not turned ON instantaneously, abrupt reduction in temperature does not occur, with the result that great influence is not affected to performance of the fixing device (fixing ability and fixing offset).

Second Embodiment

In a second embodiment of the present invention, as a way for altering temperature control of the fixing device 4, the heaters 5 are turned ON alternately with short intervals. The others are the same as those in the first embodiment.

Figure 4:
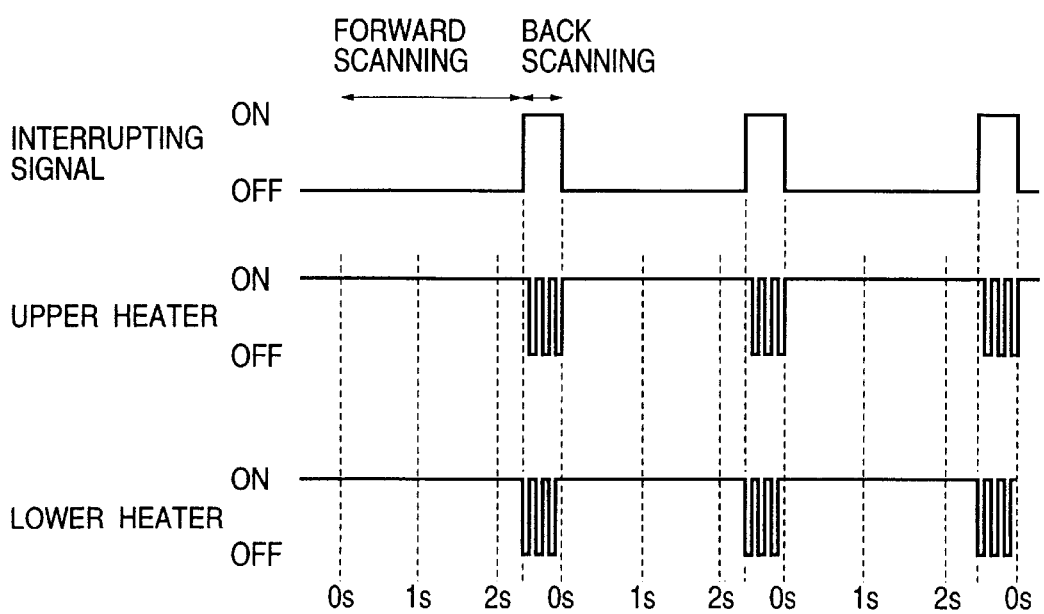
FIG. 4 is a time chart showing an ON timing of a heater in the second embodiment.

This is shown in FIG. 4.

Also in this case, in the back scanning, the consumption of electricity of 550 W corresponding to one of heaters can be reduced.

Further, since timing of peak becomes that in the scanning, peak of consumption of electricity can be reduced by 65 W.

Third Embodiment

Figure 2:
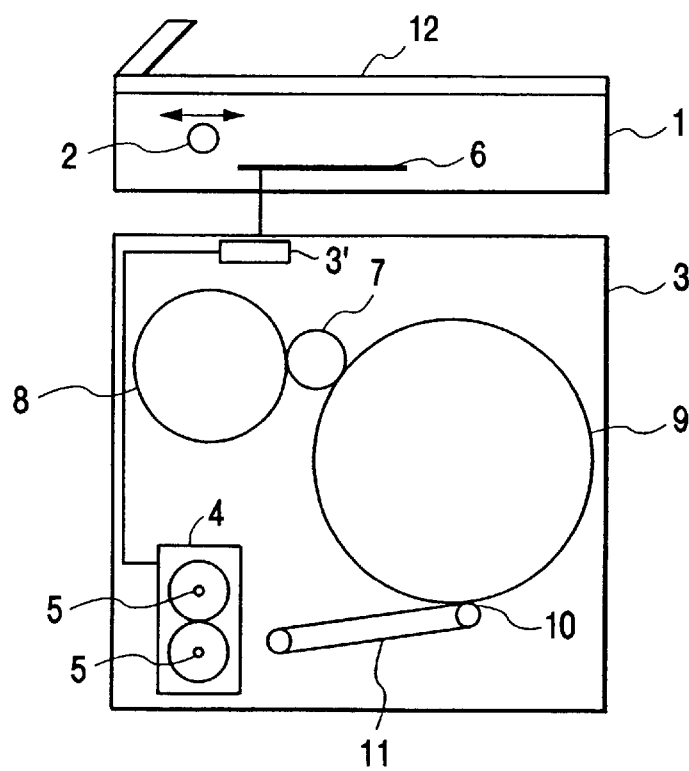
FIG. 2 is a schematic view showing an entire construction of an image forming apparatus according to third and fourth embodiments of the present invention.

FIG. 2 shows another example of an image forming apparatus according to the present invention.

An image is formed in the same manner as those in the first and second embodiments, except for the fact that the originals can automatically be exchanged by an original exchanging device 12.

In this case, the signal is sent from the reader controller 6 to the printer portion 3 in synchronous with the exchange of original. The signal is also in synchronous with the back scanning of the light source due to inherent feature of the image forming apparatus.

In the exchange of original (in the back scanning), in addition to 65 W described in connection with the first embodiment, 130 W corresponding to the original exchanging device is added, so that consumption of electricity of about 195 W in total is increased in comparison with the forward scanning.

On the basis of the signal sent, the printer portion 3 alters the temperature controlling method of the fixing device 4.

In this example, as the altering method, only one of the heaters 5 of the fixing device 4 is turned ON.

Figure 5:
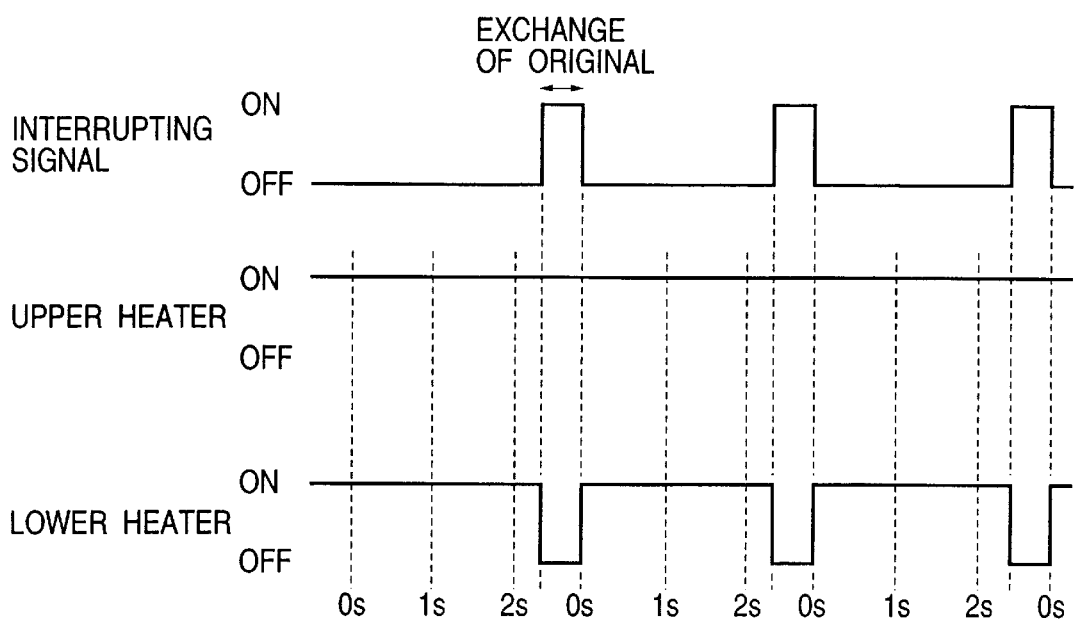
FIG. 5 is a time chart showing an ON timing of a heater in the third embodiment.

This is shown in FIG. 5.

Thus, by turning ON only the upper heater in exchange of original, peak of consumption of electricity can be reduced.

More specifically, in the back scanning, the consumption of electricity of 550 W corresponding to one of heaters in the illustrated embodiment can be reduced.

Further, since timing of peak becomes that in the scanning, peak of consumption of electricity can be reduced by 195 W.

Fourth Embodiment

In a fourth embodiment of the present invention, an image is formed in the same manner as that in the third embodiment, except for the fact that the heaters 5 are turned ON alternately with short intervals as a way for altering temperature control of the fixing device 4.

Figure 6:
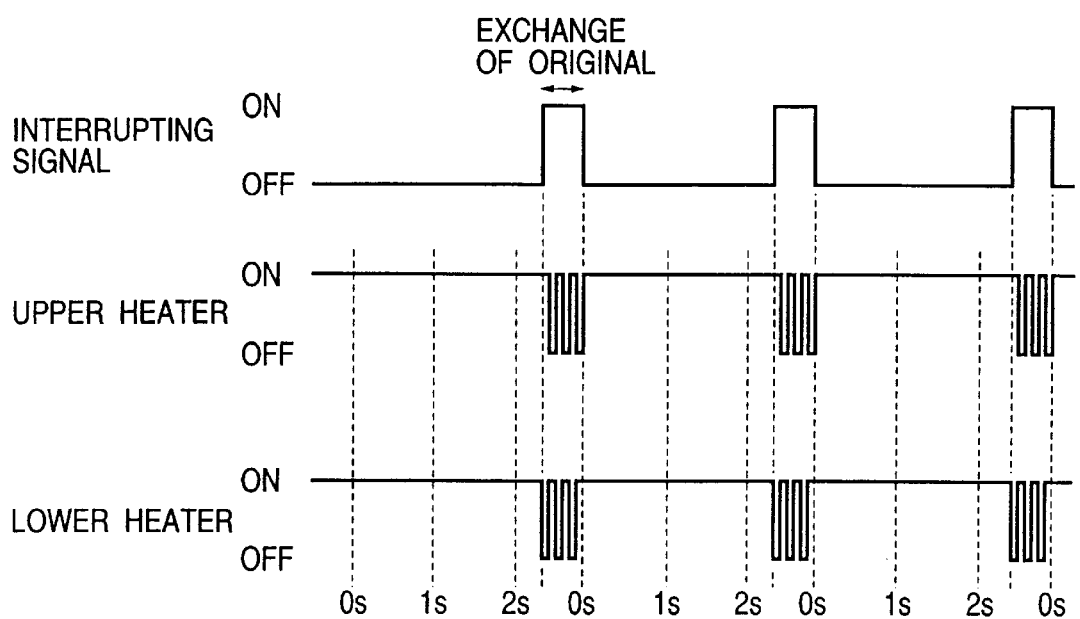
FIG. 6 is a time chart showing an ON timing of a heater in the fourth embodiment.

This is shown in FIG. 6.

Also in this case, in the back scanning, the consumption of electricity of 550 W corresponding to one of heaters can be reduced.

Further, since timing of peak becomes that in the scanning, peak of consumption of electricity can be reduced by 195 W.

Results of the first to fourth embodiments are summarized in FIG. 7.

As mentioned above, in response to the signal from the reader controller in synchronous with the back scanning of the original reading device, by altering the turning ON of the heaters of the fixing device of the printer, peak of consumption of electricity of the image forming apparatus can be reduced.

Furthermore, in response to the signal from the reader controller in synchronous with the exchange of original of the original exchanging device, by altering the turning ON of the heaters of the fixing device of the printer, peak of consumption of electricity of the image forming apparatus can be reduced.

The present invention is not limited to the above-mentioned embodiments, but various alterations can be made within the scope of the invention.

What is claimed is:

1. An image forming apparatus comprising:

a document scanning unit for scanning an original, wherein said document scanning unit can be shifted while illuminating an original and is shifted backwardly at a speed faster than a speed faster than a speed when said document scanning unit is shifted forwardly to scan the original;

image fixing means for fixing an image on a recording material; and control means for controlling an electric power supplied to said image fixing means;

wherein said control means lowers the electric power supplied to said image fixing means when said document scanning unit is shifted backwardly.

2. An image forming apparatus according to claim 1, wherein said document scanning unit comprises a light source for illuminating the original, and when said document scanning unit scans a plurality of originals, said light source is turned ON also in the backward shifting.

3. An image forming apparatus according to claim 2, wherein said light source comprises a fluorescent lamp.

4. An image forming apparatus according to claim 1, wherein said image fixing means comprises a plurality of heaters, and said control means lowers consumption of electricity of at least one of said heaters when said document scanning unit is shifted backwardly.

5. An image forming apparatus according to claim 1, wherein said image fixing means comprises a plurality of heaters, and said control means turns ON said plurality of said heaters successively when said document scanning unit is shifted backwardly.

* * * * *

UNITED STATES PATENT AND TRADEMARK OFFICE
CERTIFICATE OF CORRECTION

PATENT NO. : 6,243,546 B1
DATED : June 5, 2001
INVENTOR(S) : Yukio Watanabe et al.

It is certified that error appears in the above-identified patent and that said Letters Patent is hereby corrected as shown below:

Column 2,
Line 37, "controller 31" should read -- controller 3' --.
Line 40, "controller 31" should read -- the controller 3' --.

Column 4,
Line 39, "faster than a speed" ($2^{nd}$ occurrence) should be deleted.

Signed and Sealed this

Fourth Day of December, 2001

Attest:

NICHOLAS P. GODICI
Attesting Officer
Acting Director of the United States Patent and Trademark Office